Sept. 6, 1966  R. H. WENTORF, JR  3,271,502
HIGH PRESSURE METHOD AND APPARATUS
Filed Oct. 26, 1962  5 Sheets-Sheet 1
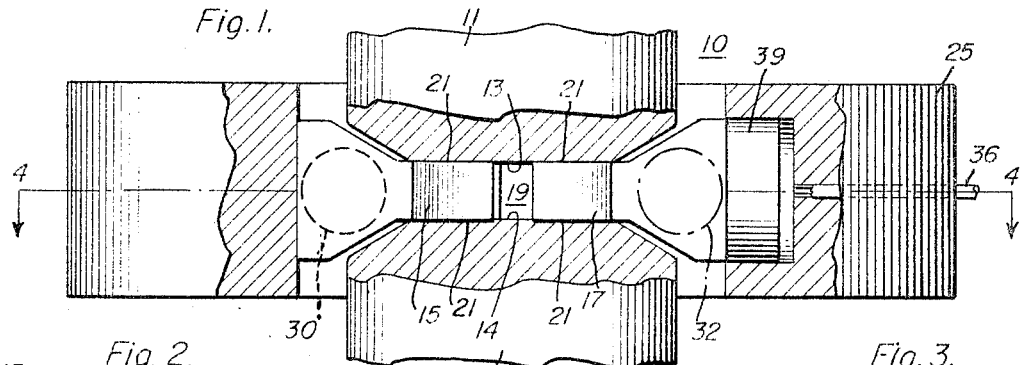
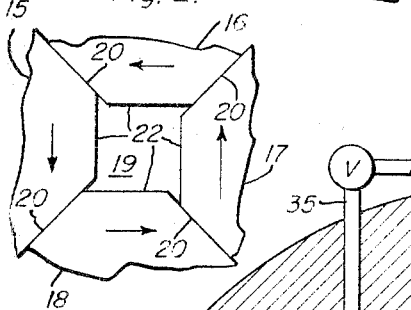
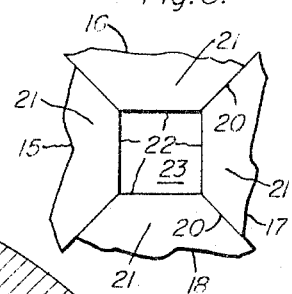
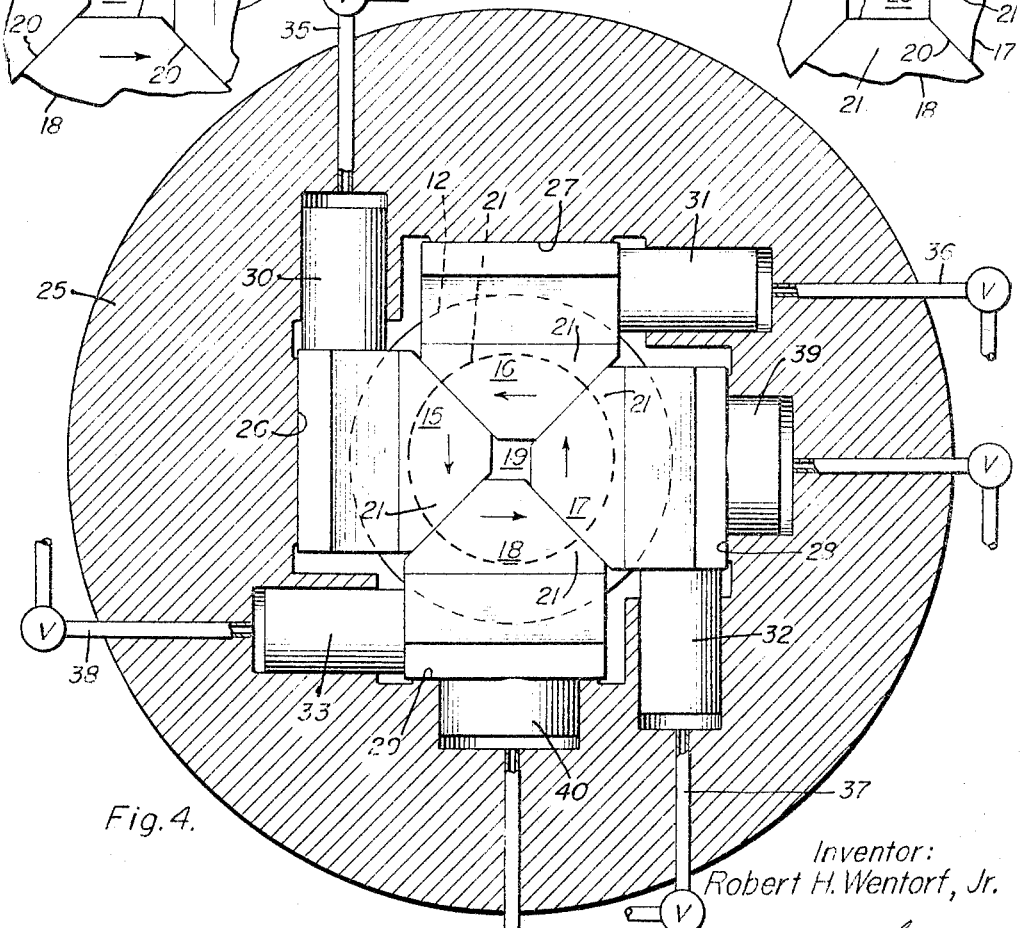
Inventor:
Robert H. Wentorf, Jr.
by James J. Lichiello
His Attorney.

Sept. 6, 1966  R. H. WENTORF, JR  3,271,502
HIGH PRESSURE METHOD AND APPARATUS
Filed Oct. 26, 1962  5 Sheets-Sheet 2

Inventor:
Robert H. Wentorf, Jr.
by James J. Lichiello
His Attorney.

Sept. 6, 1966   R. H. WENTORF, JR   3,271,502
HIGH PRESSURE METHOD AND APPARATUS
Filed Oct. 26, 1962   5 Sheets-Sheet 3

Inventor:
Robert H. Wentorf, Jr.
by James J. Lichiello
His Attorney.

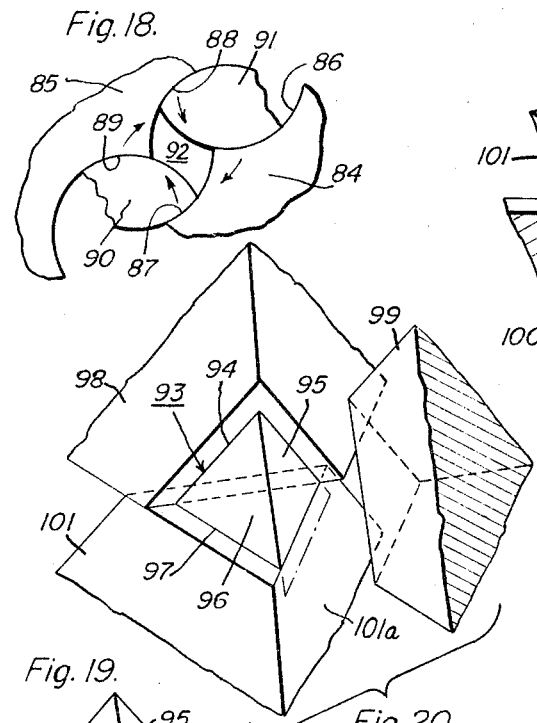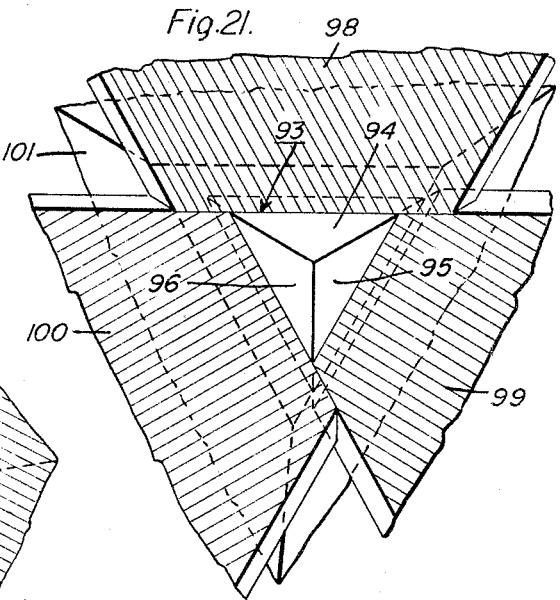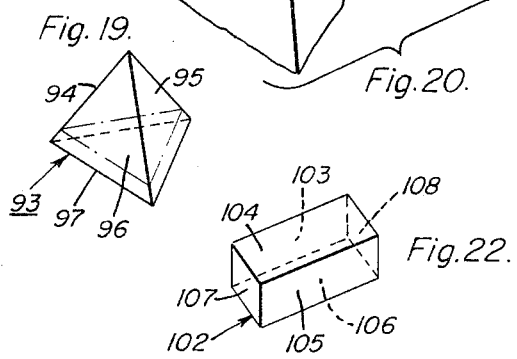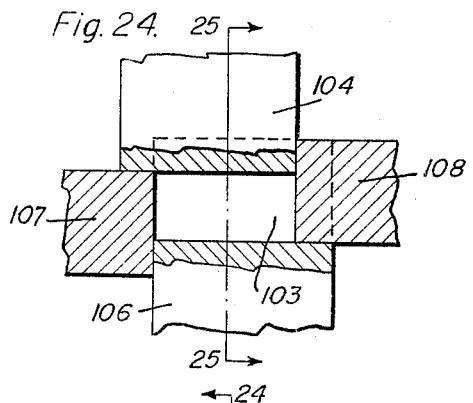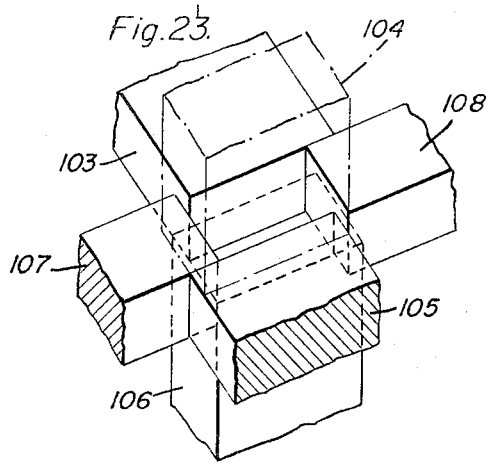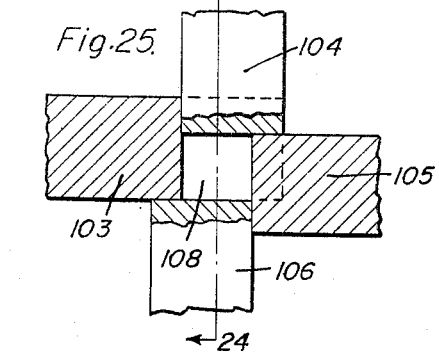
Inventor:
Robert H. Wentorf, Jr.
by James J. Lichiello
His Attorney.

Sept. 6, 1966 R. H. WENTORF, JR 3,271,502
HIGH PRESSURE METHOD AND APPARATUS
Filed Oct. 26, 1962 5 Sheets-Sheet 5

Inventor:
Robert H. Wentorf, Jr.
by James J. Lichiello
His Attorney.

United States Patent Office 3,271,502
Patented Sept. 6, 1966

3,271,502
HIGH PRESSURE METHOD AND APPARATUS
Robert H. Wentorf, Jr., Schenectady, N.Y., assignor to General Electric Company, a corporation of New York
Filed Oct. 26, 1962, Ser. No. 233,292
5 Claims. (Cl. 264—320)

This invention relates to high pressure apparatus and more particularly to high pressure apparatus which utilize a plurality of pressure resisting members or punches which overlap to define a closed reaction volume, in which a specimen material is placed, and sliding motion between and with respect to adjacent pressure resisting members serves to reduce the defined reaction volume and compress the specimen material therein. For example, four pressure resisting members may be employed to define a tetrahedral volume and the pressure resisting members slide laterally over adjacent members to reduce the tetrahedral volume to a smaller tetrahedral volume.

Various high pressure and high pressure high temperature apparatus are known in the art. One example of a high pressure apparatus is that as disclosed in U.S. Patent 2,941,248—Hall. Briefly described, the Hall patent discloses a high pressure apparatus which comprises a pair of spaced apart oppositely directed punches tapering towards each other and adapted for relative motion towards each other. Positioned concentrically between these punches is an annular belt member having a convergent divergent opening therethrough into which the tapered punches move to define a reaction volume. A specimen material in the reaction volume is subjected to high pressures by the moving punches.

Another form of a high pressure apparatus is described in copending application Serial No. 855,867—Bundy, filed November 27, 1959, and assigned to the same assignee as the present invention. This form of high pressure apparatus utilizes a plurality of pressure resisting members, in the form of tapered punch members having smaller face surfaces and larger back surfaces, which interfit with each other to define a central reaction volume, for example, a cube, between the smaller face surfaces thereof. Movement of these punches along their longitudinal axes, in a direction towards the center of the reaction volume, compresses a specimen material in the reaction volume.

These and other types of high pressure apparatus ordinarily require some form of gasketing between the punch members, as in the aforementioned Bundy application, or between the punch and belt, as in the mentioned Hall patent to seal in the reaction volume or the specimen therein. Punch motion is provided by means of compression of the gaskets to reduce the defined volume. The material from which these gaskets are formed is of major importance, and among the more satisfactory materials have been various stones, ceramics, and specific materials such as pyrophyllite, catlinite, talc, magnesia, alumina, etc. More particularly, the gasketing material provides lateral support for the high stresses imposed on the punches while at the same time these gaskets, by their compression characteristics, permit punch motion for the development of high pressures. The gasket must perform the function of continually sealing in the reaction volume during the pressure rise to very high pressures. For example, in the operation of such a high pressure apparatus, particular care must be taken so that no blowout of the gasketing occurs during pressure rise. This requires careful division between the load on the gaskets as correlated to the pressure rise in the reaction volume. However, the use of a gasket member which performs all the necessary functions as described also restricts the length of travel or motion of the punch, or pressure resisting members, as a function of its compressibility.

Thus, higher pressures may be limited because of the lack of further punch motion or travel which is required for the higher pressures. Differences in gasket materials, or combinations of materials or variances in gasket thicknesses are confined within definite limits by the described problems. Therefore, a high pressure apparatus of the reaction volume punch defining type is highly desirable where gasketing is of a minor nature, limited, or the compression thereof substantially minimized.

Accordingly, it is an object of this invention to provide an improved high pressure apparatus.

It is another object of this invention to provide an improved high pressure apparatus with minimum gasketing.

It is another object of this invention to provide a high pressure apparatus wherein compression of the gasketing material is minimized.

It is another object of this invention to provide a high pressure apparatus utilizing pressure resisting members which slide with respect to one another to reduce the volume of a reaction chamber without need of substantial gasketing therebetween.

It is another object of this invention to provide a high pressure apparatus utilizing a plurality of punches which slide over each other to reduce a defined volume, and where punch motion is not directed to the center of the reaction volume.

Briefly described, this invention in one form comprises a plurality of pressure resisting members arranged to define a closed reaction between faces thereof, and further arranged in sliding relationship with adjacent members so that lateral motion of the members directed away from the center of the reaction volume reduces the defined reaction volume and a material therein is subjected to high pressures.

This invention will be better understood when taken in connection with the following description and the drawings in which:

FIG. 1 is an exemplary cross sectional and elevation view of one form of this invention where a plurality of lateral or horizontal punches between a pair of vertical punches define an irregular reaction volume;

FIG. 2 is a schematic partial top sectional view of FIG. 1 illustrating the irregular cross section of the reaction volume;

FIG. 3 is a partial top sectional view of FIG. 1 illustrating the cross section of the reaction volume after maximum motion of the punches;

FIG. 4 is a top sectional view of FIG. 1 illustrating one method of positioning and moving of the lateral punches;

FIG. 18 is a top view of a further modification of the invention of FIG. 12 wherein four lateral punches define a reaction volume having four arcuate and two planar surfaces;

FIG. 19 is a schematic illustration of a regular tetrahedron defined by four equal faces;

FIG. 20 is a schematic illustration of the tetrahedron of FIG. 19 defined by four punches (one not shown) each punch defining one face of the tetrahedron and all punches on different axes;

FIG. 21 is a cross sectional illustration of FIG. 20 illustrating the interfitting and sliding relationship of the punches;

FIG. 22 is a schematic illustration of a rectangular parallelepiped;

FIG. 23 is a schematic illustration of six punch members defining a rectangular parallelepiped reaction volume;

FIG. 24 is a schematic and cross sectional illustration of the invention of FIG. 1 showing the interfitting and sliding relationship of the punches;

FIG. 25 is a sectional view taken on line 25—25 of FIG. 24; and

Figure 5:
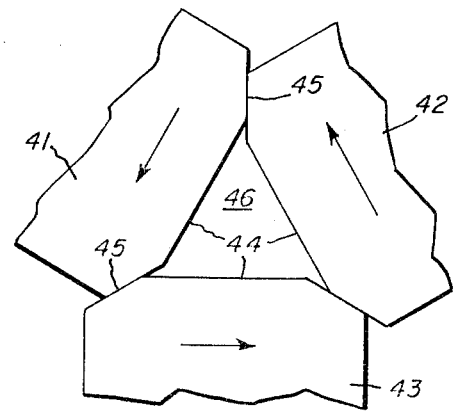
FIG. 5 is a schematic illustration of a modification of the invention of FIG. 1 with an irregular triangular type cross section reaction volume defined by the lateral punches.

It has been discovered that a given reaction volume may be reduced by defining a closed reaction volume with a plurality of pressure resisting members or punches, and arranging the punches so that they slide relative to and on each other to reduce the defined volume. By directing the motion of the punches in a tangential manner, i.e., not directed toward the center of the defined volume, the gasket principle as heretofore described is substantially eliminated.

The above features are embodied in three general forms of this invention. In the first form, the defined closed volume is of predetermined configuration and is reduced to a finite volume of a different predetermined configuration. For example, a defined closed volume may be one of an irregular cube type which is reduced to a minimum regular cube volume. The defined minimum regular cube volume is the limit of compressibility or reduction of reaction volume.

In the second form of this invention the defined closed volume of any predetermined configuration may be reduced to essentially zero volume. For example a closed regular cube volume is reduced through an infinite number of smaller regular cubes until all volume space is taken up by the moving punches and the volume is thus reduced essentially to zero.

The first and second forms of this invention generally include a pair of opposed, spaced apart, massive, flat faced pressure resisting or anvil members positioned, for example, in the vertical direction, and a plurality of radially circumferentially positioned pressure resisting or punch members therebetween and overlapped thereby. Thus pressure resisting member movement is in two planes, i.e., in a vertical plane for the opposed anvil members, and in a horizontal plane for the radial members. In the third form of this invention the defined volume may be reduced from an irregular configuration to a regular configuration or from a defined volume to essentially zero. Also in the third form of this invention, pressure resisting member movement includes movement in more than two planes and the opposed flat faced anvil members used for the first and second forms are not required. For example, a tetrahedral volume may be defined by four pressure members, each defining one face of the tetrahdral volume and each overlapping an adjacent pressure member. In this instance, the pressure members are moving in more than two planes. For movement in two planes, a pair of pressure resisting members must be joined or moved as one.

The first form of this invention, where the defined larger irregular volume is reduced to a minimum defined smaller regular volume, is illustrated in FIG. 1. In FIG. 1, high pressure apparatus 10 comprises a pair of spaced apart, oppositely positioned, large flat faced pressure resisting or anvil members 11 and 12. Members 11 and 12, referred to as anvil members, are constructed of high strength materials such as hardened tool steels, cemented tungsten carbide, etc. and are finished with relatively smooth faces 13 and 14. Between faces 13 and 14 there is positioned a plurality of lateral and inwardly directed pressure resisting or punch members 15, 16, 17, and 18 (not shown). These punch members 15, 16, 17, and 18 are arranged equally peripherally spaced at 90° intervals in a plane which is perpendicular to the longitudinal axis of pressure resisting anvil members 11 and 12. At the same time anvil members 11 and 12 overlap or overlie the punch members 15, 16, 17, and 18. The first form of this invention generally requires these anvil members 11 and 12 to have very little motion towards each other during high pressure operation. Members 11 and 12 are restricted in their axial movement by engaging the radial punches 15, 16, 17, and 18 and the operative relationship of punch members 15, 16, 17, and 18 with anvil members 11 and 12 define a closed reaction volume 19 more particularly illustrated in FIG. 2.

FIG. 2 is an illustration of a top view of the apparatus of FIG. 1 taken on the line 4—4 of FIG. 1. The lateral punch members 15, 16, 17, and 18 are illustrated as tapered or having a trapezoidal cross section with 45° tapering surfaces 20, and top and bottom flat surfaces 21. These flat surfaces 21 are adapted to engage the flat surfaces 13 and 14 of anvil members 11 and 12 of FIG. 1. Tapered surfaces 20 then define punch faces 22 which are, for example, squares of edge length L. Each lateral punch member then overlies an adjacent punch member with surfaces 20 in contiguous relationship to define an irregular or offset reaction volume 19 of a predetermined volume. In order to compress a specimen material in the reaction volume 19, the volume thereof must be reduced. Such a reduction may take place by predetermined movement of the lateral punch members 15, 16, 17, and 18 to define a regular reaction volume, for example, a cube of edge length L. Lateral punch members 15, 16, 17, and 18 are moved by the tapered surfaces 20 sliding over or along each other from the positions as in FIG. 2 to those positions as illustrated in FIG. 3 to define a regular cube reaction volume 23. The angular relationship of the sides of the cube volume is unchanged during or after punch movement operation. The maximum travel or motion of punches 15, 16, 17, and 18 is limited by the design configuration of the punches themselves in their particular interengagement. The defined cube volume 23 having the same edge length L of the punches 15, 16, 17, and 18 of FIG. 2, has a volume less than that of the irregular volume 19 of FIG. 2 as defined by the punch faces 21 also of length L. Thus, if no leakage of the specimen material out of the volume 19 occurs, the specimen material is compressed. For the form of apparatus shown in FIGS. 1 and 2:

$$\frac{\Delta V}{V} = 2\left(\frac{\Delta L}{L}\right)^2$$

where

ΔV is the change in volume
V is the final volume
L is the edge length of the square
ΔL is the lateral shift of each piston to bring it to registry or, the area of the cross section of volume 19 as illustrated in FIG. 2 is $L^2 + 2(\Delta L)^2$ whereas in FIG. 3, the area is $L^2$.

Various means may be utilized to provide movement of the lateral punch members 15, 16, 17, and 18 through proper directions so that the defined volume 19 is changed from the irregular shape as shown in FIG. 2 to the regular shape as shown in FIG. 3. While punch movement is preferred to be simultaneous with individual movement of each of the lateral punches 15, 16, 17, and 18 sliding over an adjacent punch, the punches in some modifications may also be moved in pairs. For example, moving punches 16 and 17 as one pair and 15 and 18 as another pair result in a generally square cross section reaction volume having two irregularities or projections instead of the four as illustrated in FIG. 2. Alternatively, two of the projections as illustrated may be removed and the configuration of FIG. 3 will result from movement of the prescribed pairs of punches. Punches 15, 16, 17, and 18 may be individually supported for the prescribed movement, and one preferred method of so providing punch movement is illustrated in FIG. 4.

Referring now to FIG. 4, there is disclosed a massive annular member or belt 25 wherein the four lateral punch members 15, 16, 17, and 18 are positioned with pairs of faces 22 in opposed but offset relationship. For example, the axes of the punches 15, 16, 17, and 18 which are perpendicular to faces 22 and pass through the center thereof, are not in coincident alignment for opposed punches and require lateral or tangential motion for coincident alignment. Each punch member rests upon a backing or support surfaces 26, 27, 28, and 29 so that they may slide thereupon tangentially with respect to volume 19 and provide coincident axis alignment. While various means may be employed to produce sliding action, one preferred method is the use of hydraulic piston cylinder assemblies or pressure cylinders as shown schematically at 30, 31, 32, and 33. Each punch member is connected to a hydraulic or pneumatic pressure cylinder 30, 31, 32, and 33, and the pressure cylinders are connected to a source of high pressure fluid 34 (not shown) by means of conduits 35, 36, 37, and 38. Each pressure cylinder may be connected to the source of high pressure fluid 34 for combined or simultaneous movement of the punches 15, 16, 17, and 18, or individual control of the punches may be exercised by means of suitable valve means V in the conduits 35, 36, 37, and 38.

Actuation of the pressure cylinders 30, 31, 32, and 33 causes pistons 30′, 31′, 32′, and 33′ to push against and move the lateral punch members in the directions as illustrated by their respective arrows to define a regular cube volume as illustrated in FIG. 3. Such motion to develop very high pressures may cause some sort of deformation during the operation thereof, and accordingly a suitable adjacent pair of punch members, for example 17 and 18, are provided with further pressure cylinders 39 and 40 which bear between the mentioned punch and the annulus or belt 25 not only to provide a closed position and contiguous adjacent relationship of the lateral punches during all sideward motion thereof, but also to maintain the desired relationship during any deformation of the various parts.

In order to facilitate sliding of the lateral punches, those tapered surfaces 20 of the punches which are in sliding relationship are coated with a suitable lubricant medium such as for example $MoS_2$, AgCl, Teflon, etc. The support surfaces 26, 27, 28, and 29 as well as top and bottom surfaces 21 are similarly coated. A preferred operation is to move all lateral punches simultaneously to compress a given sample in volume 19.

The reaction volume 19 is filled with a specimen material to be compressed or a reaction vessel containing a specimen material. The reaction vessel, which may be of such materials as pyrophyllite, catlinite, talc, etc., is in one or more parts which fill the irregular volume 19. As illustrated in FIG. 1, anvil members 11 and 12 are adjustably positioned to be in contiguous relationship to punches 15, 16, 17, and 18. Thereafter, movement of lateral punches 15, 16, 17, and 18 as described reduces the volume from the configuration 19 to, or toward the configuration 23 (FIG. 3) which compresses the reaction vessel and the specimen therein for high pressures. It should be understood that the configuration of the reaction volume 19, FIG. 2, progresses to that of 23, FIG. 3, and that the material therein may be subjected to the desired pressures before the reaction volume assumes the regular cube configuration. The moving force as applied to the lateral punches is directed away from the center of the reaction volume. In the form as illustrated, motion of the punches is in a direction tangential to the center of the reaction volume or perpendicular to the axis of the punches which is perpendicular to a punch face 22. Further adjustment of anvils 11 and 12 during compressing operation may be necessary to retain high pressures in the reaction volume. Therefore, a separate control is utilized for anvil members 11 and 12 so that friction between these members and the lateral punch surfaces 21 is maintained proportional to the high pressure being developed. Maximum sealing commensurate with minimum friction is desired.

Figure 6:
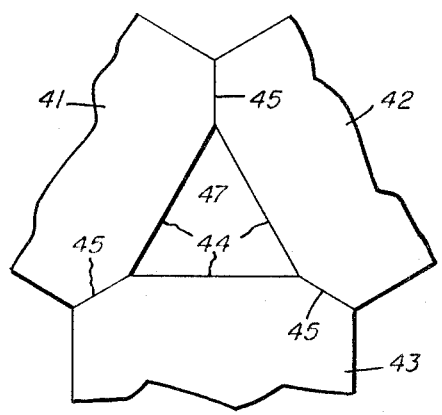
FIG. 6 is a schematic illustration of a regular triangular reaction volume resulting from maximum motion of the lateral punches of FIG. 5.

The invention as thus described is equally applicable to other reaction volumes comprising fewer or more lateral punches and with different cross sectional configurations. For example, the number of lateral punches between the vertical anvil members 11 and 12 of FIG. 1 may be three and so define a prismatic volume. Such an arrangement is illustrated in FIG. 5. In FIG. 5, punches 41, 42, and 43 are equally peripherally spaced at 120° intervals with faces 44 of rectangular or square planes. Chamfered or tapered surfaces 45 meet in abutting and sliding relationship to define an irregular volume 46. In accordance with the assembly and practice described for FIGS. 1, 2, 3, and 4, punches 41, 42, and 43 may be moved in the direction of their respective arrows. Such movement changes the volume from the larger irregular configuration 46 of FIG. 5 to the regular smaller volume 47 of FIG. 6.

Figure 7:
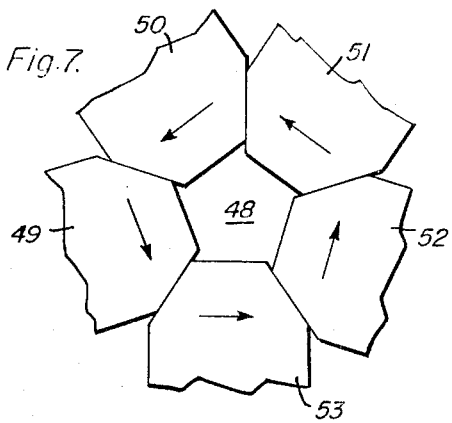
FIG. 7 is a schematic illustration of a modification of the invention of FIG. 1 with an irregular pentagon cross section reaction volume defined by the lateral punches.
Figure 8:
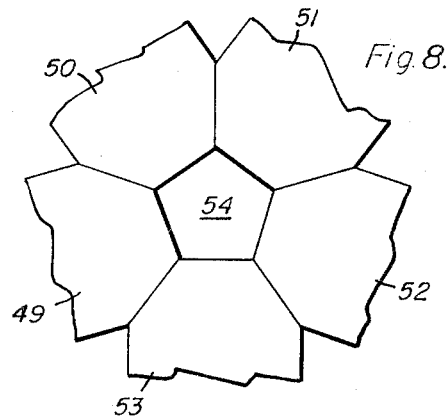
FIG. 8 is a schematic illustration of a regular pentagon cross section resulting from maximum motion of the lateral punches of FIG. 7.

The number of lateral punches may exceed four and define various polyhedra volumes. For example, in FIG. 7 the irregular volume 48 is defined by five punches 49, 50, 51, 52, and 53 which are positioned in the offset relationship as previously described for FIGS. 2, 4, and 5. Resultant motion of the punches is in the direction as illustrated by their respective arrows, and changes the larger irregular volume 48 (FIG. 7) to the smaller regular volume 54 of FIG. 8.

Figure 9:
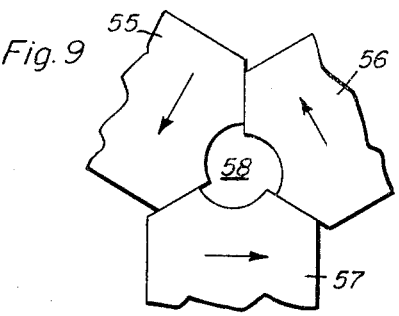
FIG. 9 is a schematic illustration of a modification of the invention of FIG. 1 with an irregular circular cross section reaction volume defined by the lateral punches.
Figure 10:
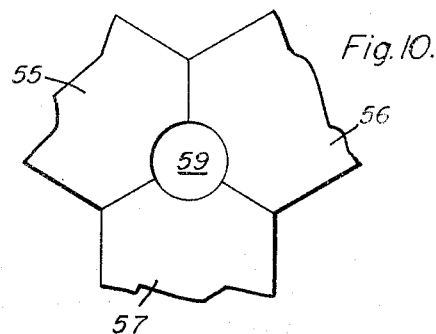
FIG. 10 is a schematic illustration of a regular circular reaction volume resulting from maximum motion of the lateral punches of FIG. 9.

The reaction volume has been illustrated and described as having planar side walls. However, the side walls may be arcuate or combinations of planes and arcs. For example, the defined reaction volume may have arcuate sides to define a final cylindrical volume. In FIG. 9, three punches 55, 56, and 57 define a volume 58 having an irregular circular cross section. Upon motion of the punches 55, 56, and 57 in the direction of the illustrated arrows, a volume 59 (FIG. 10) having a circular cross section is defined. Thus, the sides of a given reaction vessel may be regular, irregular, planar, arcuate, or various combinations thereof.

The first form of the invention has thus been described as in connection with FIGS. 1–10 as having an irregular volume defined by overlapping punches which slide on each other to change the irregular volume to a lesser volume approaching regular shape, the lesser volume being a finite one defining the maximum of punch motion. The overlapping relationship is primarily restricted to the lateral punches since anvil 11 does not overlap anvil 12 (FIG. 1 for example). However anvil members 11 and 12 overlap the lateral punches. The first form of this invention is also described as one requiring at least a pair of opposed anvil members 11 and 12 of FIG. 1 which are referred to as relatively fixed. Therefore, the top and bottom surfaces of the reaction volume defined by these two punches do not move towards each other beyond a fixed minimum which is generally the thickness of the lateral punches between anvil members 11 and 12.

It is noted that the prescribed movement of the lateral punches is tangential to a radius from the center of the reaction volume. Consequently, the lateral punches do not move towards the center of the reaction volume, and therefore do not vary their position to open or close a gap between adjacent punches. Sliding action of the lateral punches over each other is thus used to reduce the defined volume.

In the second form of this invention the reaction volume defined by a plurality of overlapping lateral punches may be reduced, by sliding of the punches over each other, to essentially zero. Such an arrangement is illustrated in FIG. 11.

Figure 11:
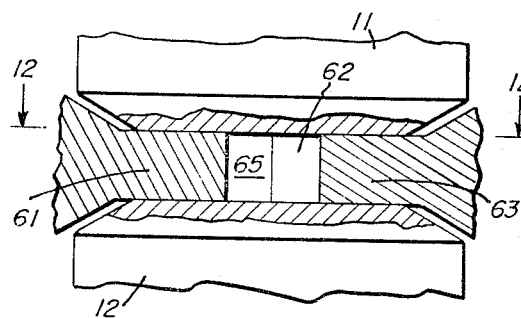
FIG. 11 is a partial elevational cross section view of an arrangement whereby a regular right angled reaction volume is defined by a pair of vertical punches and four lateral punches and where motion of the lateral punches may reduce the reaction volume to zero.
Figure 12:
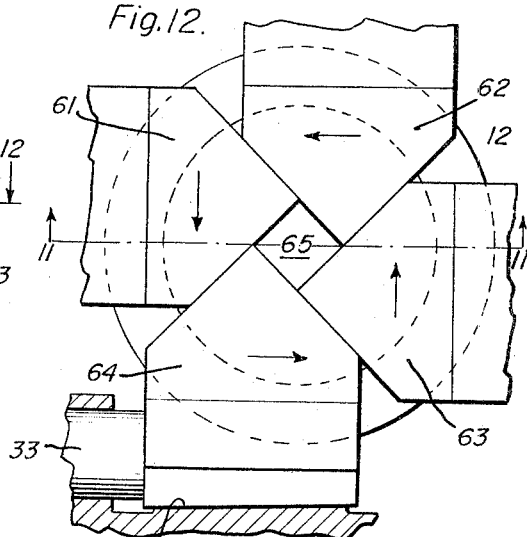
FIG. 12 is a partial top cross sectional view of the lateral punch members of FIG. 11.

Referring now to FIG. 11, there is illustrated an apparatus 60 which comprises a pair of spaced apart opposed anvil members 11 and 12 being similar in all respects to those anvil members 11 and 12 of FIG. 1. A plurality of lateral punches 61, 62, 63, and 64 (not shown) arranged similarly to those of FIG. 1, define therebetween, and in combination with anvil members 11 and 12, a predetermined reaction volume 65. The volume configuration of 65 may be that of a cube, rectangular parallelepiped, etc. For example, in FIG. 12, which is a top cross sectional view of FIG. 11, the defied volume 65 is of a square cross section. The lateral punches 61, 62, 63, and 64 may be operatively positioned in a ring or belt assembly as illustrated and described with respect to FIG. 4, and moved by suitable fluid pressure means as in FIG. 4. Punch motion is in the direction as shown by the arrows on the respective punches of FIG. 12 and the volume 65 may thus be reduced to essentially zero. During volume reduction, it is noted that no change in the angular relationship of the sides occurs. While the preferred practice of this invention is directed to the operation where each lateral punch slides over an adjacent lateral punch, these punches may be moved in pairs. If the punches are moved in pairs, the movement of only one pair results in the center of the reaction also being moved. The same is true if one of the punches remains stationary and the remaining punches are moved thereabout. Punch motion is best referred to as resultant motion relative to the fixed center of the reaction volume. Thus, in the first form of this invention, the resultant motion was tangential to the reaction volume. The applied force to the punches was also in the same direction or coincident with the resultant motion. In the second form of this invention the applied force and the resultant motion need not be coincident since initial punch motion may comprise a tangential component, and a radial component towards the center of the reaction volume. The initial applied force may be provided by the hydraulic piston units of FIG. 4 or by mechanical means for side or tangential motion of the punches. The radially inward component may be provided by cam surfaces. For example, the surfaces 26, 27, 28, and 29 of FIG. 4 may be slant surfaces. As applied to FIG. 12, a slant surface 29' is shown supporting punch 64. When piston 33 moves punch 64 laterally, punch 64 moves upon slant surface 29' towards reaction volume 65. Accordingly, the punches may be moved through various combinations of directions to provide a resultant motion whereby the punches slide over each other to reduce the defined volume. In all instances, the applied force is not directed to the center of the reaction volume.

The motion mechanism employed to move the lateral punches may include means to provide the resultant punch motion or be separate therefrom. Suitable examples of motion mechanism for the lateral punches are rocking and tilting mechanisms, rotary mechanisms, overcenter devices, one-way clutch locks and combinations thereof.

Figure 13:
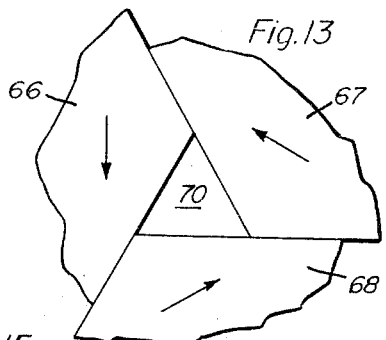
FIG. 13 is a partial top view of a modification of the invention of FIG. 11 wherein three lateral punches define a regular triangular cross section reaction volume.

The number of lateral punches in the second form of this invention may vary from three to a number greater than four to define different polyhedral reaction volumes. For example, in FIG. 13 there is shown a group of three lateral punches 66, 67, and 68. These lateral punches define, in combination with anvil members 11 and 12, a prismatic volume 70. When these punches are positioned in an apparatus similar to that shown in FIGS. 4 and 11, the resulting motion, as indicated by the respective arrows, serves to reduce volume 70.

Figure 14:
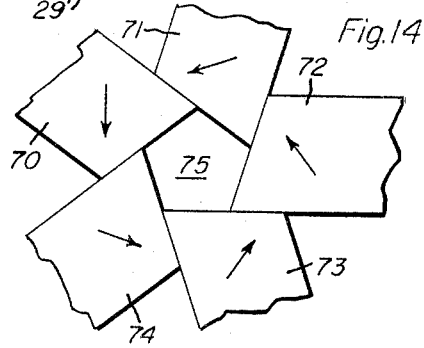
FIG. 14 is a top view of a further modification of the invention of FIG. 12 wherein five lateral punches define a regular pentagon cross section reaction volume.

An example of a polyhedral reaction volume taken from the group of those volumes having more than four lateral sides is illustrated in FIG. 14. In FIG. 14, five punches 70, 71, 72, 73, and 74 define a volume 75 having a pentagon cross section. When this arrangement is positioned in an apparatus similar in principle to those shown in FIGS. 4 and 11, the resultant motion of the punches in the direction as illustrated by the arrows, reduces the volume 75.

In the embodiment as described for both the first and second mentioned forms of this invention, the punch faces defining the reaction volume need not be planar but may be arcuate or combinations of arcuate and planar. Therefore, the sides of the defined final volume, for example, may include angular or other projections therein or therefrom. Furthermore, as previously mentioned in connection with the first form of this invention and where applicable, the punches may be moved in pairs. Also one or more punches may remain fixed.

Figure 15:
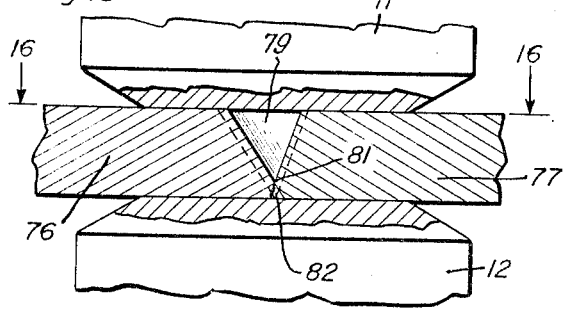
FIG. 15 is a cross section partial elevation view of yet another modification of the lateral punch members of FIG. 11 defining a tetrahedral reaction volume.
Figure 16:
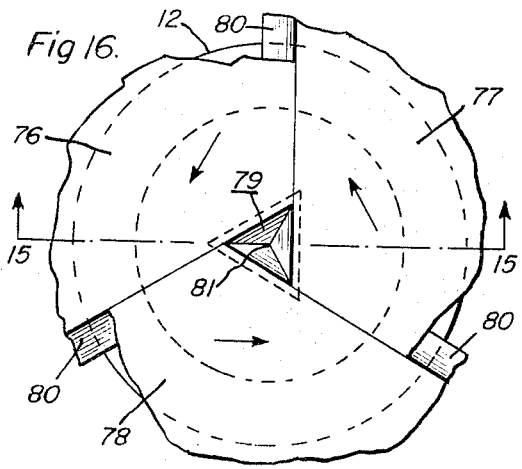
FIG. 16 is a partial top sectional view of the three lateral punches of FIG. 15 defining a tetrahedral reaction volume.
Figure 17:
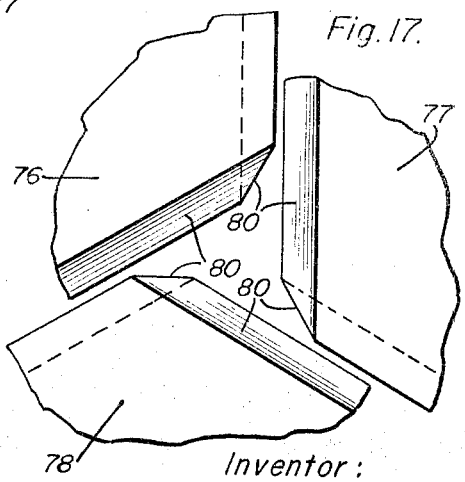
FIG. 17 is a schematic enlarged view of the punches of FIG. 16 illustrating their interfitting and overlapping relationship for movement to reduce a tetrahedral volume.

Both the first and second forms of this invention may include defined volumes wherein only one of the forms referred to as "fixed anvils" defines a prescribed side surface. Such an arrangement is described with respect to FIGS. 15, 16, and 17. Referring now to FIG. 15, there is shown in partial section a pair of spaced apart opposite anvil members 11 and 12 as in FIG. 1. The lateral punch members 76, 77, and 78 (not shown) are positioned in overlapping relationship to define a tetrahedral volume 79. For the purposes of more clearly defining the tetrahedral volume, reference is made to FIG. 16. In FIG. 16, there is shown a top view of the three lateral punches 76, 77, and 78 defining, in conjunction with anvil members 11, a tetrahedral volume 79. In the illustrated arrangement, the lateral punches 76, 77, and 78 are positioned for example, on one of the anvil members 12 of FIG. 1 with each side surface flushly engaging side surfaces of adjacent punches. The volume defined by this relationship is a tetrahedral volume 79. Punches 76, 77, 78 have front faces which define each said surface of a tetrahedron and are thus slant surfaces. Also, the engaging side surfaces 80 between punches are also slant surfaces. The relative interengagement of the punches is more clearly shown in FIG. 17. In FIG. 17, punches 76, 77, and 78 are shown out of engagement with each other to show slant surfaces 80. When these punches are moved into engagement the configuration of FIG. 16 is defined. An alternate way of defining this arrangement is to place three regular octahedra in the relationship as shown in FIG. 16 and the tetrahedral reaction volume 79 will be defined. Punch members 76, 77, and 78 are utilized in a belt arrangement similar in principle to that of FIG. 4 and employ a cam or other means as described with respect to FIG. 12 to provide dual component motion and reduction of volume 79. In FIG. 16 it is to be noted that the bottom apex 81 of the tetrahedral volume 79 is also the top apex of an opposite tetrahedral volume 82 similar to volume 79. Thus as one volume 82 is reduced, the opposite volume is increased. This arrangement of FIG. 17 may be double, i.e., stacked one upon another, to provide a hexahedron reaction volume. In other words, the addition of a mirror image of tetrahedral volume 79 is a hexadedron.

It has been described above that the front faces of the punch members may be arcuate, or various combinations of arcs and planes. A plurality of arcuate punch members may define an irregular arcuate reaction volume which is reduced by linear and rotary motion. One such apparatus is illustrated in FIG. 18. Referring now to FIG. 18, apparatus 83 includes a pair of spaced apart punch members 84 and 85 having adjacent arcuate depressions 86 and 87 and 88 and 89 respectively therein. Opposite arcuate depressions, such as 86 and 88 for example, define or include ovoid member 90 and 91 therein. The relationship of these members when the punch members 84 and 85 are in their offset relationship as shown define a reaction volume 92. Motion of the punches 84 and 85 in the direction of the illustrated arrows causes rotary type motion of the ovoids 90 and 91 in the direction of their illustrated arrows to reduce the reaction volume 92.

A third form of this invention is referred to as that form requiring punch motion in at least three planes. Also, as may be seen from the drawings (FIGS. 21 and 23) there must be at least four punches to define the closed volume and the sliding movement of these punches relative to, and on, each other is such that no more than two of these punches move in the same plane. The first and second forms of this invention described a plurality of lateral punches moving between spaced apart vertically positioned anvil members. One plane, the horizontal or lateral plane, contains all lateral punches and the vertical plane contains the anvil members. Thus, the first and second forms of this invention are two plane forms where the planes are perpendicular to each other. The first two forms also require a pair of anvil members 11 and 12 which move along coincident axis. FIG. 16 is also classified in these forms.

The third form of this invention includes the various polyhedra, for example, the tetrahedron, hexahedron, octahedron, etc., which are defined by a plurality of individual punch members, each of which may in turn define one or more faces of the polyhedron.

Thus for example, referring to FIG. 19, a tetrahedral volume 93 is defined by the four faces 94, 95, 96, and 97. The same tetrahedral volume 93 is shown in FIG. 20, which is a partial, cut-away view. The faces 94, 95, 96, and 97 are defined in FIG. 19 by the overlapping faces of the four punches 98, 99, 100 (not shown), and 101. The faces of these punches are each larger than the faces 94, 95, 96 and 97 of the tetrahedron 93, and the punches therefore overlap so as to define a tetrahedral volume 93 which may be made smaller without limit by appropriate sliding motions of the punches upon one another. It is evident that more than one overlapping arrangement of punches is possible.

FIG. 21 is an alternate view of the parts shown in FIG. 20 illustrating the overlapping punch arrangement with all punches in place. The apex of the defined tetrahedron is intended to be represented as extending up from the plane of the paper.

Reduction in the volume of tetrahedron 93 occurs by the sliding of the punches 98, 99, 100 and 101 relative to each other; thus punch 98 moves against face 94, punch 100 moves against face 96, and punches 99 and 101 hold against faces 95 and 97, respectively. These actions are possible because (a) both punches 98 and 100 slide over the upper surface of punch 101, which is in contact with face 97; (b) punches 99 and 100 slide over the surface of punch 98, which is in contact with face 94, and (c) in addition, punch 99 slides both over the surface of punch 100, which is in contact with face 96, and over the side slope 101a of punch 101. As these relative motions occur, the only punches moving in the same plane are punches 98 and 100, because the underside of each must remain in contact with the upper surface of punch 101.

As another example, a rectangular parallelepiped shaped volume may be compressed from all sides by the appropriate sliding motions of suitable punches. Referring to FIG. 22, the rectangular parallelepiped 102 is defined by the six surfaces 103, 104, 105, 106, 107, and 108. The same parallelepiped is shown in FIG. 23, which is a partial cut-away view. The punch members of FIG. 23 bear the same numerals as the faces of the parallelepiped of FIG. 22 thus indicating a particular punch defining a particular face. For the sake of clarity the punch member 104 is shown by dashed lines only. As is shown by the heavy lines forming the vertical corners of punches 103 and 108, these punches are at a higher level than punches 105 and 107 and are in contact with vertical surfaces of punch 104. FIGS. 24 and 25 are cross sectional views of the reaction volume illustrating the overlapping relationship of the punches for sliding motion. FIG. 24 illustrates a longitudinal view through the parallelepiped reaction volume and FIG. 25 illustrates a transverse view.

Reduction in volume of parallelepiped 102 occurs by the sliding of the punches 103, 104, 105, 106, 107 and 108 relative to each other. This overall motion is a composite of (a) the motion of all punches about the vertical central axis of volume 102 in a clockwise direction viewing the upper faces of punches 103, 105, 107 and 108 in plan; (b) movement of the punches 104, 105 and 107 downwardly (toward punch 106 and (c) movement of punches 106, 103 and 108 upwardly (toward punch 104). As the result of this complex motion the only punches that can move in the same plane at any instance are punches 105 and 107 on the one hand and punches 103 and 108 on the other.

The third form of this invention may define, first, an irregular volume, and finally a regular volume as in the first form of the invention, or may reduce the defined volume to essentially zero as in the second form of the invention. In some of these arrangements sliding of the punches to reduce the defined volume may provide openings along a given edge. These openings, however, may be closed by proper gasketing or the use of more punches. In apparatus of this third form, no more than two punches move in the same plane and more than two planes of motion are involved. In describing one or more planes for punch motion, it is assumed that basically one separate and distinct punch is utilized to define each face or side of a reaction volume. For example, a tetrahedral volume is defined by four punches (the expedient of combining a pair of punches as one punch is not considered). Thus, in the first and second forms of this invention, two planes include all punch motion of the axis of motion. In other words, one vertical plane contains the two coincident vertical anvils and one horizontal plane contains the axis of all lateral punches. In the third form of this invention, the planes of movement are at least three.

In all of the embodiments of this invention, gasketing or sealing means may be provided between sliding surfaces. These gaskets, however, do not become a limitation upon punch travel or maximum pressures as heretofore described.

Generally speaking, this invention is described as a given closed reaction volume which is defined by a plurality of interfitting overlapping pressure resisting members all of which are in sliding relationship. The arrangement provides a reduction in volume of the reaction chamber along more than two axes.

Figure 26:
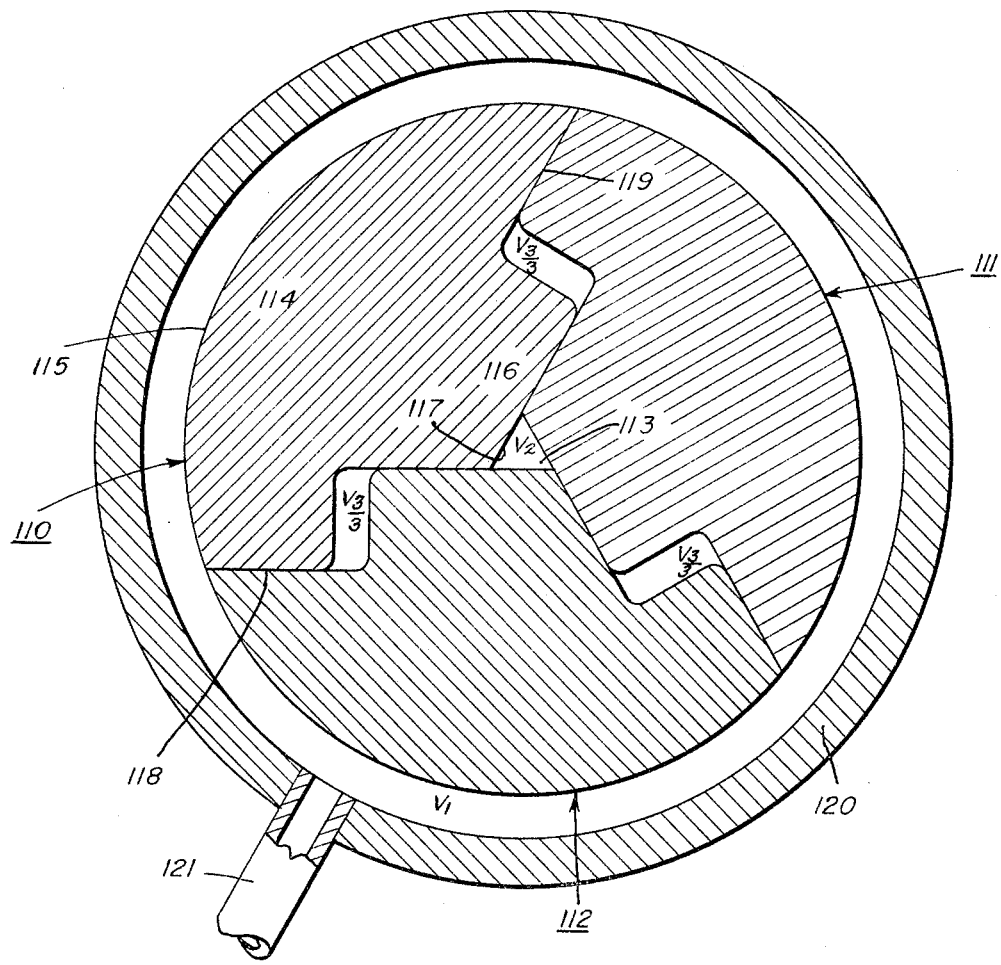
FIG. 26 is an illustration of a modification employing a two stage effect.

The principle of two-staging or pressure amplification may be applied to the apparatus of this invention where the apparatus is encased in an envelope structure and fluid under pressure is introduced into the space between the apparatus and the envelope. One application is illustrated in FIG. 26, which is similar to the apparatus of the second form of this invention as described relative to FIG. 13. In FIG. 26, three lateral punch members 110, 111, and 112 interfit to define a reaction volume 113 of triangular cross section. Each punch, for example punch 110, includes a larger back portion 114 with a predetermined area 115 and a smaller projecting front portion 116 with a smaller work area 117. The smaller projecting front portion defines a pair of shoulders 118 and 119. When the punch members are arranged as illustrated, the shoulder portion of one punch and the adjacent projecting portion of an adjacent punch defines a tertiary volume $V_3$ and the smaller front portions of the punches define the reaction volume $V_2$. The apparatus, shown in cross section, is surrounded by a special wall 120 to define a volume $V_1$. A hydrostatic pressure fluid at pressure $P_1$ is introduced into volume $V_1$ by conduit 121 to exert pressure on and move the punches to reduce the reaction volume. Pressure amplification takes place as follows. Assume the pressure in $V_3$ to be 0. If the pistons are incompressible, then when the pistons are all moved by a small amount, the increase in Volume $V_1$ will be $dV_1$ and will equal the decrease in volume of $V_2$ and $V_3$, i.e., $dV_1+dV_2+dV_3=0$.

The work done on the piston is $P_1 dV_1$; the work performed by the piston is $P_2 dV_2$; because the piston is assumed to be incompressible, no work is stored in the piston and one has $P_1 dV_1 + P_2 dV_2 = 0$.

By making use of the relationship among the $dV$'s one obtains $$\frac{P_2}{P_1} = -\frac{dV_1}{dV_2} = 1 + \frac{dV_3}{dV_2}$$

There is thus an amplification of pressure ($P_2 > P_1$) for any value of $$\frac{dV_3}{dV_2} > 0$$

A key feature of this invention is the sliding action of one punch over another to define a closed volume and thereafter to reduce the closed volume. An additional feature of this invention is that the force or motion applied to the pressure resisting or punch members is applied to move the punch members in a direction which is not along their longitudinal axes directed towards the center of the described reaction volume, but in a direction which does not intersect the center of the reaction volume and thereby the punches or pressure resisting members move closer in interfitting relationship to reduce the defined volume of the reaction chamber.

The high pressure apparatus of this invention provides very salient advantages. For example, there is a better pressure distribution in the sample material when a plurality of punches are moved. It follows that a more uniform hydrostatic pressure is also generated. A most important feature is the fact that gasket compression is not a limiting factor and gaskets, if employed, need not be highly compressed in order to compress the sample. One of the reasons for limited gasket compression is that the angular relationship of the sliding surfaces remains constant during sliding motion.

While specific methods and apparatuses in accordance with this invention are described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A method of compressing a specimen material comprising in combination:
   (a) defining a close reaction volume by means of at least four overlapping pressure resisting members which slide on each other,
   (b) placing the specimen in said volume, and
   (c) providing force on said pressure resisting members to slide and said pressure resisting members over each other to reduce the said volume and compress the said specimen therein,
      (1) the directions of sliding of said pressure resisting members being such that no more than two of said pressure resisting members move in the same plane.

2. A high pressure apparatus comprising in combination:
   (a) at least four punch members arranged in overlapping and sliding relationship to define a closed central reaction volume, and
   (b) means to move said punch members relative to each other with sliding motion over each other to reduce the said volume,
      (1) said punch members moving so that no more than two of said punch members move in the same plane.

3. The high pressure apparatus substantially as recited in claim 2 wherein four punch members are employed to define a tetrahedron.

4. The high pressure apparatus substantially as recited in claim 2 wherein lubricant means are employed between sliding punch members.

5. The high pressure apparatus substantially as recited in claim 2 wherein gasketing means are employed between sliding punch members.

References Cited by the Examiner

UNITED STATES PATENTS

| | | |
|---|---|---|
| 494,004 | 3/1893 | Kester. |

FOREIGN PATENTS

| | | |
|---|---|---|
| 1,178,560 | 12/1958 | France. |
| 289,891 | 1/1916 | Germany. |
| 1,035,352 | 7/1958 | Germany. |
| 18,294 | 11/1889 | Great Britain. |
| 871,373 | 6/1961 | Great Britain. |

ROBERT F. WHITE, *Primary Examiner.*

ALEXANDER H. BRODMERKEL, *Examiner.*

M. R. DOWLING, *Assistant Examiner.*